US011497064B2

(12) United States Patent
Clark et al.

(10) Patent No.: US 11,497,064 B2
(45) Date of Patent: Nov. 8, 2022

(54) NETWORK CONNECTION SELECTIONS BASED ON QUALITY SCORES

(71) Applicant: Hewlett-Packard Development Company, L.P., Spring, TX (US)

(72) Inventors: Alexander Wayne Clark, Spring, TX (US); Kent E Biggs, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 2 days.

(21) Appl. No.: 16/606,408

(22) PCT Filed: Apr. 19, 2017

(86) PCT No.: PCT/US2017/028262
§ 371 (c)(1),
(2) Date: Oct. 18, 2019

(87) PCT Pub. No.: WO2018/194574
PCT Pub. Date: Oct. 25, 2018

(65) Prior Publication Data
US 2020/0045756 A1 Feb. 6, 2020

(51) Int. Cl.
*H04L 1/00* (2006.01)
*H04W 76/10* (2018.01)
(Continued)

(52) U.S. Cl.
CPC ........... *H04W 76/10* (2018.02); *H04L 1/0001* (2013.01); *H04L 43/106* (2013.01);
(Continued)

(58) Field of Classification Search
CPC ............. H04B 7/18541; H04B 17/382; H04M 15/8038; H04W 28/0226; H04W 40/36;
(Continued)

(56) References Cited

U.S. PATENT DOCUMENTS 8,750,188 B2 6/2014 Nicoara et al.
9,241,292 B2 1/2016 Jain
(Continued)

FOREIGN PATENT DOCUMENTS

CA 2930622 A1 11/2016

OTHER PUBLICATIONS

Make Your Android Automatically Switch to the Strongest Wifi Network, Nov. 8, 2016 https://android.gadgethacks.com/how-to/make-your-android-automatically-switch-strongest-wifi.

*Primary Examiner* — Salvador E Rivas
(74) *Attorney, Agent, or Firm* — Tong, Rea, Bentley & Kim LLC

(57) ABSTRACT

In example implementations, methods for selecting a network connection for paired endpoint devices and an apparatus for performing the same is provided. The method includes establishing a connection to a mobile endpoint device. A first quality score associated with a wireless connection of the mobile endpoint device is calculated based on a parameter associated with the wireless connection between the mobile endpoint device and a wireless network. A network selection is made based on a comparison of the first quality score and a second quality score. The second quality score is associated with a connection between the computer and a communication network.

15 Claims, 4 Drawing Sheets

(51) Int. Cl.
*H04W 24/08* (2009.01)
*H04L 47/70* (2022.01)
*H04L 43/106* (2022.01)
*H04W 72/12* (2009.01)
*H04W 52/26* (2009.01)
*H04W 4/80* (2018.01)
*H04W 84/12* (2009.01)
*H04W 28/08* (2009.01)

(52) U.S. Cl.
CPC ............ *H04L 47/826* (2013.01); *H04W 24/08* (2013.01); *H04W 52/265* (2013.01); *H04W 72/1226* (2013.01); *H04W 4/80* (2018.02); *H04W 28/0908* (2020.05); *H04W 84/12* (2013.01)

(58) Field of Classification Search
CPC ....... H04W 28/0819; H04W 12/00502; H04W 28/0908; H04W 52/265; H04W 72/1226; H04L 41/064; H04L 43/106; H04L 47/826; H04L 1/0001
See application file for complete search history.

(56) References Cited

U.S. PATENT DOCUMENTS

| | | | |
|---|---|---|---|
| 9,392,067 | B2 | 7/2016 | Anders et al. |
| 9,467,845 | B1* | 10/2016 | Rastogi .................. H04W 8/14 |
| 2006/0198454 | A1* | 9/2006 | Chung .................. H04L 25/022 |
| | | | 375/260 |
| 2006/0221807 | A1* | 10/2006 | Fukuoka ............. H04L 27/2602 |
| | | | 370/203 |
| 2011/0116444 | A1 | 5/2011 | Relyea |
| 2012/0324067 | A1 | 12/2012 | Hari et al. |
| 2014/0071895 | A1 | 3/2014 | Bane et al. |
| 2014/0297755 | A1 | 10/2014 | Pfeifer |
| 2016/0007387 | A1 | 1/2016 | Adib et al. |
| 2016/0234767 | A1 | 8/2016 | Hassan |
| 2017/0048127 | A1* | 2/2017 | Almodovar Chico .. H04L 43/50 |
| 2017/0374594 | A1* | 12/2017 | Khawam ............... H04W 36/30 |

\* cited by examiner

NETWORK CONNECTION SELECTIONS BASED ON QUALITY SCORES

BACKGROUND

Networks may allow devices to communicate and to exchange data. The quality of networks can vary based on the type of network. For example, a wired network may be faster and more consistent than a wireless network that can experience more interference. Similarly, a wireless Wi-Fi network may have a better network connection than a cellular network used by the phone.

The quality of networks can also vary based on location. For example, how wireless access points are located within an office building may affect the network quality depending on a location. Some locations may have better coverage than other locations within the building. This may be due to strength of a particular wireless access point, interference due to many walls or barriers, and the like.

DETAILED DESCRIPTION

The present disclosure relates to an approach for selecting a network connection for paired devices and an apparatus for performing the same. As discussed above, the quality of network connections can vary due to the type of connection or a location. One of the paired devices may have a better network connection than the network connection of the other paired device. The difference in the network connections may be due to a variety of reasons.

Examples of the present disclosure automatically select the best network connection for the paired devices based on a comparison of the respective network connections of the paired devices. For example, one device may have a wireless connection to a wireless network and the other device may have a wired connection to a broadband network. The present disclosure may objectively compare the wireless network and the broadband network to determine the better network connection and direct the paired device with the lower quality network connection to connect to the higher quality network connection through a local connection of the paired devices.

Figure 1:
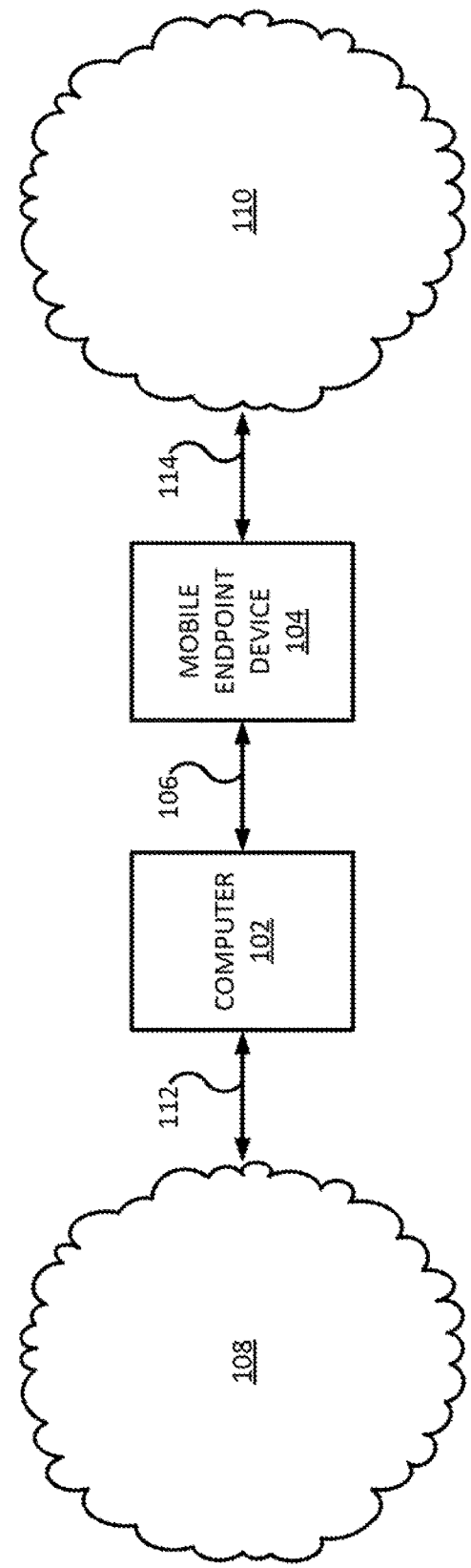
FIG. 1 is a block diagram of an example system of a paired devices of the present disclosure.

FIG. 1 illustrates a block diagram of a communication network 100 of the present disclosure. The communication network 100 may include a computer 102 and a mobile endpoint device 104. The computer 102 may be any type of computing system such as a desktop computer, a laptop computer, a tablet computer, and the like. The computer 102 may establish a connection 112 to a communication network 108. The connection 112 may be a wired or wireless connection. The communication network 108 may be an Internet protocol (IP) network such as a broadband network, a Wi-Fi network and the like.

The mobile endpoint device 104 may be a device that is capable of wireless communications. For example, the mobile endpoint device 104 may be a smart phone, a tablet computer, and the like. The mobile endpoint device 104 may establish a wireless connection 114 to a wireless network 110. The wireless network 110 may be a Wi-Fi network, a cellular network, and the like.

It should be noted that FIG. 1 has been simplified for ease of explanation. For example, the communication network 108 and the wireless network 110 may include additional network elements not shown (e.g., a gateway, a router, an access point, a border element, a firewall, and the like).

In one implementation, the computer 102 and the mobile endpoint device 104 may be paired via a local connection 106. In some examples, the local connection 106 may be a short range communication protocol, such as Bluetooth®, that allows the computer 102 and mobile endpoint device 104 to communicate when close (e.g., in the same room) to one another. In some examples, the local connection 106 may be a wireless connection, such as Institute of Electrical Electronics Engineering (IEEE) 802.11. In some examples, the local connection 106 may be a wired connection such as a universal serial bus (USB) connection, an Ethernet connection, and the like.

In some implementations, the computer 102 and the mobile endpoint device 104 may be connected to different networks (e.g., the communication network 108 and the wireless network 110, respectively). This may be due to different capabilities. For example, the computer 102 may not have wireless capabilities and use an Ethernet connection to connect to the communication network 108.

In another example, the different network connections may be due to different security permissions of the computer 102 and the mobile endpoint device 104. For example, the communication network 108 may be a secured Wi-Fi network of an enterprise and the computer 102 may be a work computer that has permission to access the communication network 108. The mobile endpoint device 104 may be a personal device of the user and may not have permission to access the communication network 108. As a result, the mobile endpoint device 104 may use a cellular service of the wireless network 110. Thus, the computer 102 may not be able to directly connect to the wireless network 110, or the mobile endpoint device 104 may not be able to directly connect to the communications network 108.

However, in some instances, the performance of the communication network 108 may be superior to the performance of the wireless network 110, or vice versa. Thus, the user may want to leverage the superior performance of the communication network 108 or the wireless network 110 for both the computer 102 and the mobile endpoint device 104. The computer 102 may automatically monitor the performance of the communication network 108 and the wireless network 110 (e.g., via data sent to the computer 102 from the mobile endpoint device over the local connection 106), calculate a quality score of the communication network 108 and the wireless network 110, and automatically select the best network connection based on the respective quality scores of the communication network 108 and the wireless network 110.

In one implementation, the computer 102 may collect parameters associated with the communication network 108 and collect parameters associated with the wireless network 110. The parameters may be measured based on data transmitted over the communication network 108 or the wireless network 110. For example, the computer 102 may transmit test data packets, or pinging data packets, periodically. In one example, the parameters may be collected based on information exchanged between the computer 102 and the mobile endpoint device 104 over the local connection 106.

The computer 102 may calculate a quality score for the communication network 108 and the wireless network 110 based on the parameters that are collected. The respective quality scores may be compared by the computer 102. If the quality score of the communication network 108 is higher than the quality of score of the wireless network 110, then the computer 102 may maintain a connection to the communication network 108. The computer 102 may also instruct the mobile endpoint device 104 to connect to the communication network 108 via the local connection 106.

If the quality score of the wireless network 110 is higher than the quality of score of the communication network 108, then the computer 102 may connect to the wireless network 110 via the local connection 106. In one implementation, the computer 102 may ask permission from the mobile endpoint device 104 to access the wireless network 110 as the user may have to pay for data or have a limited amount of data if the wireless network 110 is a cellular network of the user. For example, a confirmation message may be generated and sent from the computer 102 to the mobile endpoint device 104.

In one example, the quality score may be a numerical score that is based on the parameters of the respective network connection. The parameters may include a throughput value, a latency value, a packet loss value, a network signal strength value, a number of network drops value, a goodput percentage, or a combination thereof. The parameters may be assigned a numerical value (e.g., a value between 1-5, 1 being the worst and 5 being the best, a scaled value between 0-100 based on measurements of a respective parameter, a letter grade, and the like). To illustrate, when no packet loss is measured for the communication network 108 a value of 5 may be assigned for the packet loss parameter, when packet losses above a first threshold are measured for the communication network 108, a value of 4 may be assigned for the packet loss parameter, and so forth. Values may be similarly assigned to each parameter that is used to calculate the quality score of communication network 108 or the wireless network 110.

In one implementation, when multiple parameters are used to calculate the quality score, a sum of the values for each respective parameter may be calculated for the quality score. For example, the wireless network 110 may have a values of 5, 4, 4, and 3 for the latency value, the packet loss value, the network signal strength value and the number of network drops value. Thus, the quality score for the wireless network 110 may be the sum of 5, 4, 4, and 3, or 16.

In another implementation, when multiple parameters are used to calculate the quality score, an average of the values for each respective parameter may be calculated for the quality score. For example, the communication network 108 may have a values of 80, 75, 95, and 90 for the latency value, the packet loss value, the network signal strength value and the number of network drops value. Thus, the quality score for the wireless network 110 may be the average of 80, 75, 95, and 90, or 85.

In one implementation, a single parameter may be used. For example, the throughput may be value that is based on the overall performance of a network that accounts for various different parameters. Thus, a single parameter of the throughput value may be used as the quality score.

In one implementation, the values of parameters may be weighted. For example, certain parameters may be more important to the quality score than others. For example, throughput and the latency of the network connection may be more important than the signal strength. As a result, the throughput value and the latency value may be multiplied by a weighting factor, whether the quality score is a sum or an average.

In one example, the parameters that are used to calculate the quality score may be user defined. For example, certain parameters may be important to a user and other parameters may be irrelevant to the user. For example, one user may feel that the best user experience is when packet loss is minimized and not care about the speed or throughput of the network. Another user may want minimum latency and high throughput and not care about packet loss or signal strength. Thus, the quality score may be based on parameters that are defined by the user.

Figure 2:
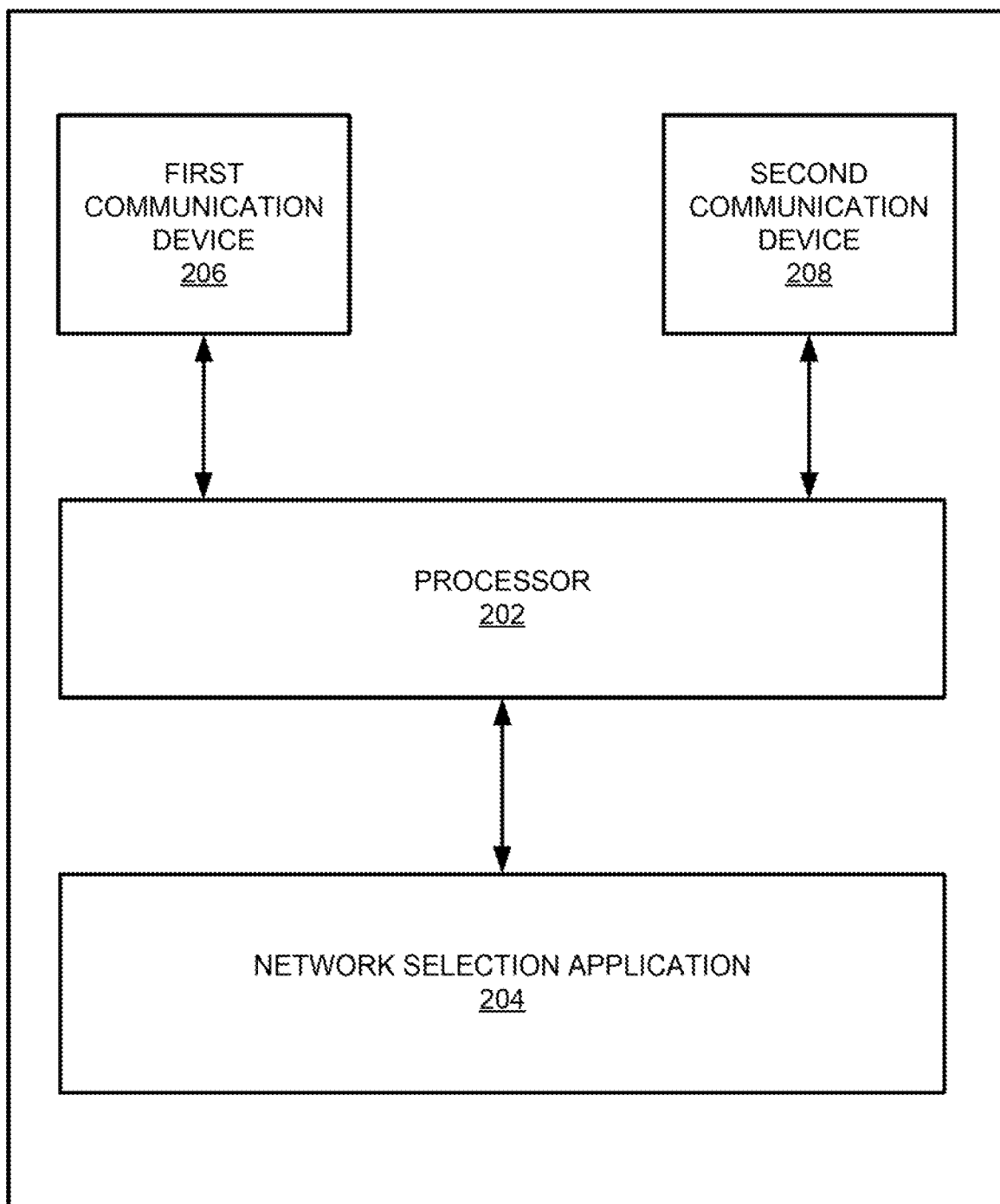
FIG. 2 is a block diagram of components of the example computer of the present disclosure that automatically selects a network connection for paired devices.

FIG. 2 illustrates a block diagram of components of the computer 102 of the present disclosure that automatically selects a network connection for paired devices. In one implementation, the computer 102 may include a processor 202, a network selection application 204, a first communication device 206 and a second communication device 208. The processor 202 may be in communication with the network selection application 204, the first communication device 206 and the second communication device 208. The processor 202 may execute instructions associated with the network selection application to perform the functions described herein.

In one example, the first communication device 206 may be a component to establish the connection 112 to the communication network 108. The first communication device 206 may be a network adapter. The network adapter may be a wired network adapter that uses an Ethernet connection or a wireless network adapter that uses a Wi-Fi connection.

In one example, the second communication device 208 may be a component to establish the local connection 106 to the mobile endpoint device 104. For example, the second communication device 208 may be a Bluetooth® radio.

In one implementation, the processor 202 may receive data from the communication network 108 via the first communication device 206. The data from the communication network 108 may be used by the network selection application 204 to measure, or to collect, various parameters and assign values for the parameters, as described above. The network selection application 204 may then calculate a quality score for the communication network 108.

The processor 202 may also receive data from the wireless network 110, or parameters from the mobile endpoint device 104, via the second communication device 208. For example, the data may be received by the mobile endpoint device 104 and continuously, or periodically, transmitted to the processor 202 over the local connection 106. The data from the wireless network 110 may be used by the network selection application 204 to measure, or to collect, various parameters and assign values for the parameters, as described above. The network selection application 204 may then calculate a quality score for the wireless network 110.

The network selection application 204 may then compare the quality score of the communication network 108 and the quality score of the wireless network 110. The network selection application 204 may select the network connection with the higher quality score. For example, if the communication network 108 has the higher quality score, the network selection application 204 may maintain the connection to the communication network 108. In addition, the network selection application 204 may generate an instruction that is transmitted to the mobile endpoint device 104 via the local connection 106. The instruction may instruct the mobile endpoint device to connect to the communication network 108 via the local connection 106 to the computer 102.

On the other hand, if the wireless network 110 has the higher quality score, the network selection application 204 may instruct the processor 202 to disconnect the connection between the first communication device 206 and the communications network 108. In addition, the network selection application 204 may instruct the processor 202 communicate over the wireless network 110 via the local connection 106 to the mobile endpoint device 104.

In some instances, the wireless network 110 may be a cellular network. The user may have a limited data plan or pay for data transmitted over the cellular network. As a result, in some implementations, the network selection application 204 may generate a confirmation message that is transmitted to the mobile endpoint device 104. The confirmation message may request a confirmation (e.g., pressing a continue button on a graphical user interface of the mobile endpoint device 104 that causes a confirmation signal to be transmitted over the local connection 106 to the computer 102) from the mobile endpoint device 104 that the computer 102 may have permission to connect to, and to transmit data over, the wireless network 110.

The network selection application 204 may collect the data, calculate the quality scores, and select the network connection periodically (e.g., every 15 minutes, every hour, every 5 hours, every day, and the like). In another example, the network selection application 204 may collect the data, calculate the quality scores, and select the network connection continuously.

In some implementations, a threshold or a pre-defined value may be used to prevent constant switching between the communications network 108 and the wireless network 110. In other words, the threshold or the pre-defined value may be used to ensure that the difference is significant to prevent constant switching between the communications network 108 and the wireless network 110.

For example, the performance of the communications network 108 and the wireless network 110 can vary over time due to various different factors (e.g., number of users, interference, downed equipment, and the like). Thus, in some implementations, the network selection application 204 may select a different network connection based on a comparison of the quality score and when an absolute value of the difference of the quality scores is greater than the pre-defined value, or threshold.

To illustrate, pre-defined value may be set at five. The quality score of the communication network 108 may be 30 and the quality score of the wireless network 110 may be 33. However, the network selection application 204 may maintain the connection to the communication network 108 even though the quality score of the wireless network 110 is higher because the difference (e.g., 33−30=|3|=3 or 30−33=|−3| =3) is less than the pre-defined value of five.

In another example, the pre-defined value may be a percentage. For example, the pre-defined value may be set to be 5 per cent. Thus, the network selection application 204 may not change the selection of the network connection unless the difference in the quality scores is greater than 5 per cent of one another.

In one implementation, the network selection application 204 may apply a delay before making a network selection. The network selection application 204 may then calculate the quality score of the communication network 108 and the quality score of the wireless network 110 and perform the comparison of the quality scores again. The delay may ensure that the quality scores were not a result of a temporary downgrade in performance as the performance of a network can vary from time to time. In one example, the delay may be a few seconds (e.g., 5 seconds, 30 seconds, and the like).

In one example, the network selection application 204 may apply a maximum number of changes for a certain time period. For example, the network selection application 204 may limit the number of changes to the network connection that can be made to one every one minute. Limiting the number of changes per a certain time period may limit the processing overhead caused by mapping operations that can be performed in response to changing the network selection.

In one example, the network selection application 204 may generate a message to be displayed on the device that is changing the network connection. For example, if the computer 102 is changing the network connection from the communication network 108 to the wireless network 110, a message may be displayed on the computer 102. Similarly, if the mobile endpoint device 104 is changing the network connection from the wireless network 110 to the communication network 108, a message may be displayed on the mobile endpoint device 104. The network selection application 204 may wait to receive a confirmation before making a change in selection of the network connection.

Figure 3:
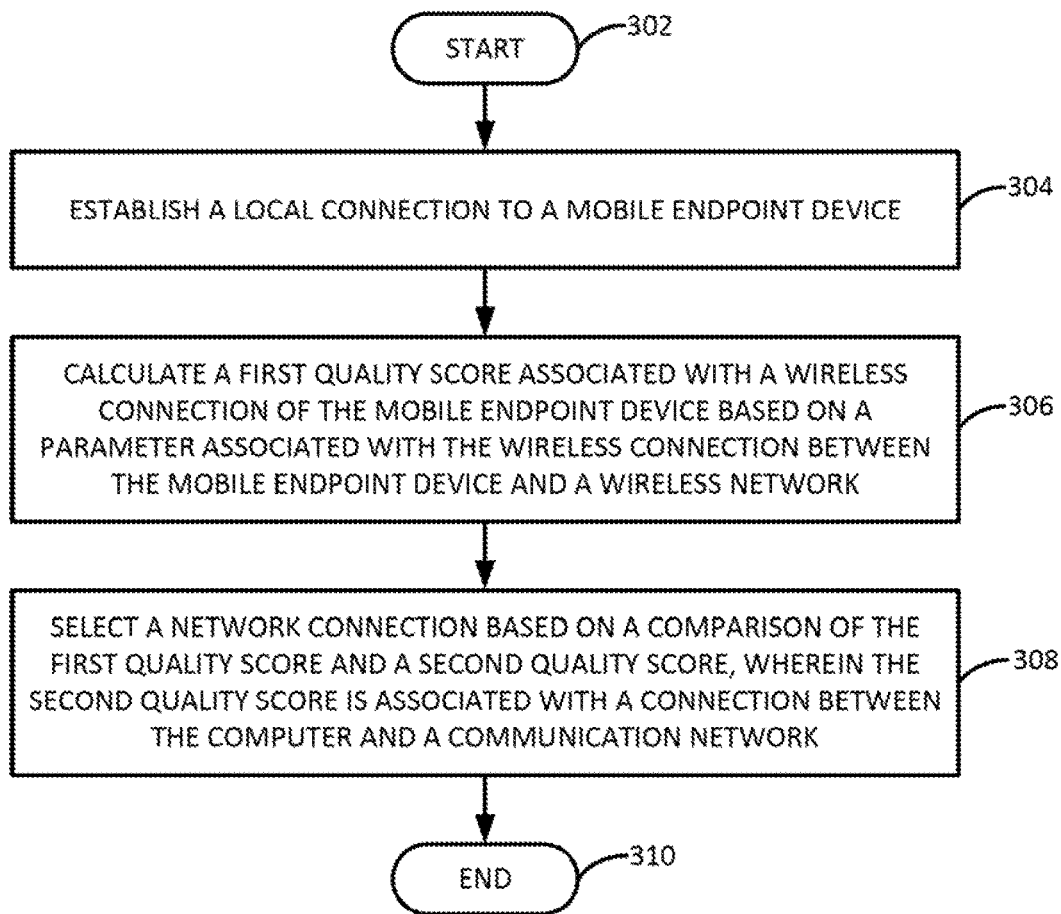
FIG. 3 is a block diagram of an example method for selecting a network connection for a computer and a mobile endpoint device that is paired.

FIG. 3 illustrates a flow diagram of an example method 300 for selecting a network connection for a phone and a computer that is paired with the phone. In one example, the method 300 may be performed by the computer 102 or an apparatus 400 described below and illustrated in FIG. 4.

At block 302, the method 300 begins. At block 304, the method 300 establishes a local connection to a mobile endpoint device. For example, a computer may be paired with the mobile endpoint device via the local connection. When paired, the computer and the mobile endpoint device may work together to improve productivity. However, as noted above, the computer and the mobile endpoint device may not have access to the same network connection individually.

At block 306, the method 300 calculates a first quality score associated with a wireless connection of the mobile endpoint device based on a parameter associated with the wireless connection between the mobile endpoint device and a wireless network. For example, data transmitted over the wireless connection may be transmitted to the computer via the local connection by the mobile endpoint device. The data may contain information (e.g., packet data, transmission times, delay times, round trip times, and the like) that can be used to measure parameters associated with the performance of the wireless network. In addition, the mobile endpoint device may provide additional data to the computer over the local connection such as signal strength.

The computer may assign values to the parameters associated with the wireless network. The values may be used by the computer to calculate the first quality score. For example, the first quality score may be a sum, an average, or a weighted average of the values of the parameters, as described above.

At block 308, the method 300 selects a network connection based on a comparison of the first quality score and a second quality score associated with a connection between the computer and a communication network. In one implementation, the computer may also calculate the second quality score associated with the connection between the computer and the communication network using data transmitted over the communication network.

The computer may measure parameters based on the information contained in the data, as described above. The computer may assign values to the parameters and the values may be used to calculate the second quality score. Based on the comparison of the first quality score and the second quality score, the computer may select a network connection to the network with the higher quality score. For example, if the first quality score is higher than the second quality score, the computer may select the wireless network and connect to the wireless network via the local connection to the mobile endpoint device. If the second quality score is higher than the first quality score, the computer may maintain the connection to the communication network and instruct the mobile endpoint device to connect to the communication network via the local connection to the computer. At block 312, the method 300 ends.

Figure 4:
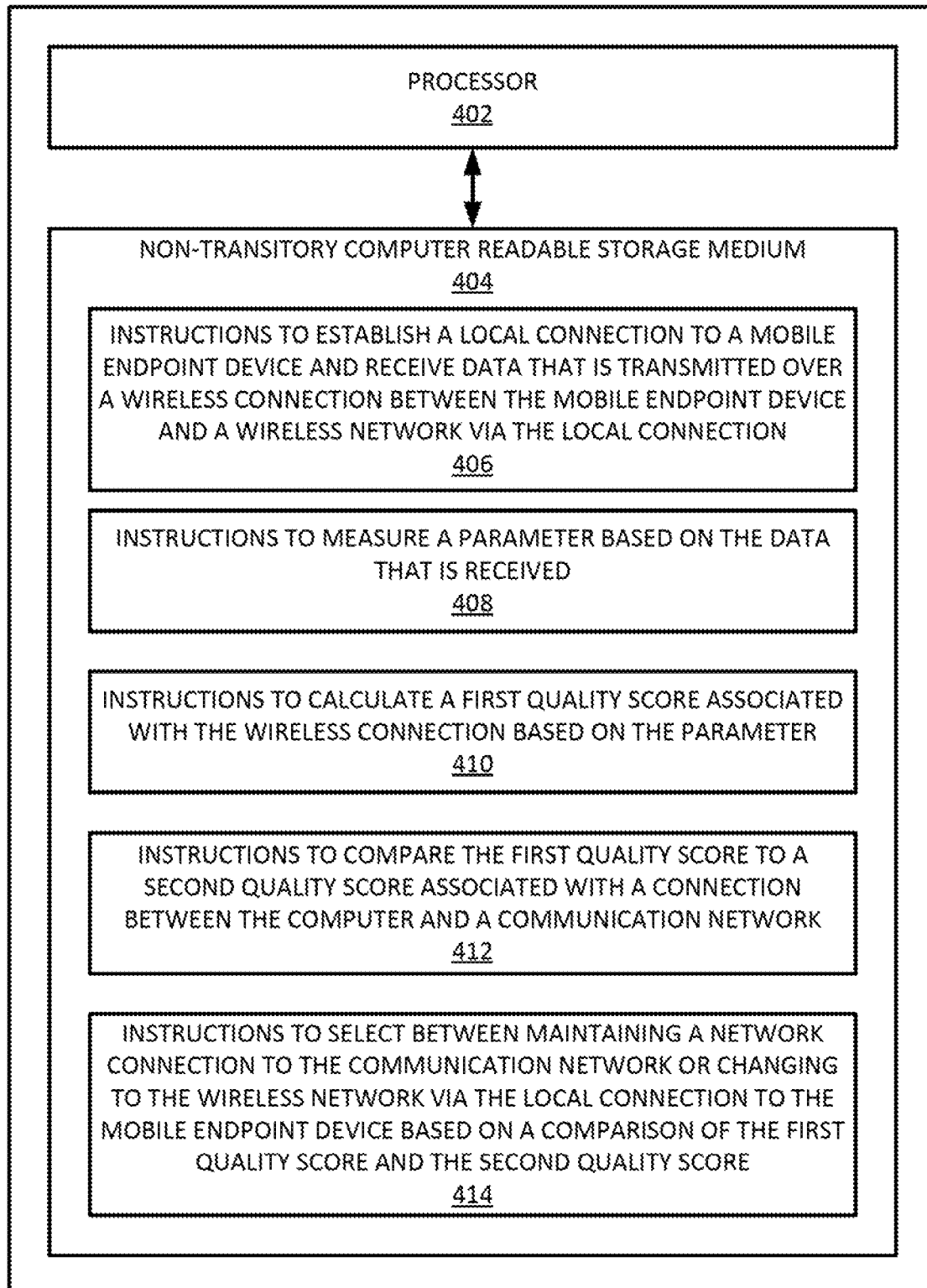
FIG. 4 is an example non-transitory computer readable medium storing instructions executed by a processor for selecting a network connection for paired devices of the present disclosure.

FIG. 4 illustrates an example of an apparatus 400. In one example, the apparatus 400 may be the computer 102. In one example, the apparatus 400 may include a processor 402 and a non-transitory computer readable storage medium 404. The non-transitory computer readable storage medium 404 may include instructions 406, 408, 410, 412 and 414 that when executed by the processor 402, cause the processor 402 to perform various functions.

In one example, the instructions 406 may include instructions to establish a local connection to a mobile endpoint device and receive data that is transmitted over a wireless connection between the mobile endpoint device and a wireless network via the local connection. The instructions 408 may include instructions to measure a parameter based on the data that is received. The instructions 410 may include instructions to calculate a first quality score associated with the wireless connection based on the parameter. The instructions 412 may include instructions to compare the first quality score to a second quality score associated with a connection between the computer and a communication network. The instructions 414 may include instructions to select between maintaining the network connection to the communication network or changing to the wireless network via the local connection to the mobile endpoint device based on a comparison of the first quality score and the second quality score.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   establishing, by a processor of a computer, a connection to a communication network;
   establishing, by the processor, a local connection to a mobile endpoint device that is connected to a wireless network that is a different type of network than the communication network connected to the computer;
   calculating, by the processor, a first quality score associated with a wireless connection of the mobile endpoint device based on a parameter associated with the wireless connection between the mobile endpoint device and the wireless network;
   calculating, by the processor, a second quality score associated with the connection to the communication network;
   comparing, by the processor, the first quality score to the second quality score;
   selecting, by the processor, the wireless network for both the computer and the mobile endpoint device via the local connection;
   determining, by the processor, that a maximum number of changes for a time period has not been reached before selecting the wireless network and connecting to the wireless network via the local connection; and
   connecting, by the processor, to the wireless network via the local connection to the mobile endpoint device when the first quality score is greater than the second quality score or maintaining a connection to the communication network when the second quality score is greater than the first quality score.

2. The method of claim 1, wherein the wireless network is selected when a difference between the first quality score and the second quality score is greater than a pre-defined value.

3. The method of claim 1, comprising:
   generating, by the processor, a confirmation message to connect to the wireless network via the local connection to the mobile endpoint device when the first quality score is greater than the second quality score.

4. The method of claim 1, wherein the parameter comprises a throughput value, a latency value, a packet loss value, a network signal strength value, a number of network drops, or a combination thereof.

5. The method of claim 4, wherein the parameter that is selected to calculate the first quality score and the second quality score are user defined.

6. The method of claim 1, wherein the selecting is performed when a difference between the first quality score and the second quality score is greater than a threshold.

7. The method of claim 1, further comprising:
   applying, by the processor, a delay after calculating the first quality score, calculating the second quality score, and comparing the first quality score to the second quality score;
   re-calculating, by the processor, the first quality score associated with the wireless connection;
   re-calculating, by the processor, the second quality score associated with the connection to the communication network; and
   repeating, by the processor, a comparison between the first quality score and the second quality score that is re-calculated.

8. A non-transitory computer readable storage medium encoded with instructions executable by a processor of a computer, the non-transitory computer-readable storage medium comprising:
   instructions to establish a connection to a communication network;
   instructions to establish a local connection to a mobile endpoint device that is connected to a wireless network that is a different type of network than the communication network connected and receive data that is transmitted over a wireless connection between the mobile endpoint device and the wireless network via the local connection;
   instructions to measure a parameter based on the data that is received;
   instructions to calculate a first quality score associated with the wireless connection based on the parameter;

instructions to calculate a second quality score associated with the connection to the communication network;

instructions to compare the first quality score to the second quality score;

instruction to apply a delay after calculating the first quality score, calculating the second quality score, and comparing the first quality score to the second quality score;

instructions to re-calculate the first quality score associated with the wireless connection;

instructions to re-calculate the second quality score associated with the connection to the communication network;

instructions to repeat a comparison between the first quality score that is re-calculated and the second quality score that is re-calculated; and instructions to select between maintaining a network connection to the communication network when the second quality score is greater than the first quality score or changing to the wireless network via the local connection to the mobile endpoint device when the first quality score is greater than the second quality score for both the computer and the mobile endpoint device via the local connection.

9. The non-transitory computer readable storage medium of claim 8, comprising:

instructions to calculate the second quality score based on a parameter associated with the network connection.

10. The non-transitory computer readable storage medium of claim 8, comprising:

instructions to transmit an instruction to the mobile endpoint device to connect to the communication network via the local connection to the computer when maintaining the network connection to the communication network is selected in response to the second quality score being higher than the first quality score.

11. The non-transitory computer readable storage medium of claim 8, comprising:

instructions to generate a confirmation message to connect to the wireless network via the local connection to the mobile endpoint device when changing to the wireless network is selected in response to the first quality score being greater than the second quality score.

12. The non-transitory computer readable storage medium of claim 8, wherein the calculating and the comparing are performed periodically.

13. A computer, comprising:

a first communication module to establish a network connection to a communication network;

a second communication module to establish a local connection to a mobile endpoint device; and a processor in communication with the first communication module and the second communication module, wherein the processor is to:

receive a parameter associated with a wireless connection between the mobile endpoint device and a wireless network, wherein the wireless network is a different type of network than the communication network, calculate a first quality score associated with the wireless connection based on the parameter, calculate a second quality score associated with the communication network, compare the first quality score to the second quality score, apply a delay after calculating the first quality score, calculating the second quality score, and comparing the first quality score to the second quality score;

re-calculate the first quality score associated with the wireless connection;

re-calculate the second quality score associated with the connection to the communication network;

repeat a comparison between the first quality score that is re-calculated and the second quality score that is re-calculated, determine that a maximum number of changes for a time period has not been reached before selecting the wireless network and connecting to the wireless network via the local connection, and select to maintain a network connection to a communication network when the second quality score is greater than the first quality score or to change to the wireless network via the connection to the mobile endpoint device when the first quality score is greater than the second quality score for both the computer and the mobile endpoint device via the local connection.

14. The computer of claim 13, wherein the processor is to calculate the second quality score based on a parameter associated with the network connection.

15. The computer of claim 13, wherein the first communication module comprises a network adapter and the second communication module comprises a Bluetooth radio.

* * * * *